(12) United States Patent
Yamamoto et al.

(10) Patent No.: US 6,551,673 B1
(45) Date of Patent: Apr. 22, 2003

(54) VEHICLE GLASS WITH ANGLED EDGE

(75) Inventors: Takeshi Yamamoto, Worthington, OH (US); Akihiko Kuribayashi, Dublin, OH (US); Michael Peterson, Columbus, OH (US); Antoine Kmeid, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,829

(22) Filed: Mar. 10, 2000

(51) Int. Cl.$^7$ .................. B28B 21/00; B28B 21/72; B28B 23/08; B29D 22/00; B29D 23/00
(52) U.S. Cl. ................ 428/34.4; 428/34.5; 428/60; 296/200; 296/146.15; 296/84.1; 296/85; D12/182; D12/183; 362/503
(58) Field of Search ................ 428/34.1, 34.4, 428/34.5, 57, 60; 296/190.1, 200, 146.1, 146.15, 84.1, 85, 87; D12/404, 182, 183; 362/503

(56) References Cited

U.S. PATENT DOCUMENTS 3,015,518 A * 1/1962 Nelson .................. 296/91
6,321,495 B1 * 11/2001 Oami .................. 52/208

FOREIGN PATENT DOCUMENTS

JP 2-270629 A * 3/1990 .......... B60J/1/02
JP 411059171 A * 3/1999 .......... B60J/1/00

* cited by examiner

Primary Examiner—Harold Pyon
Assistant Examiner—Michael C. Miggins
(74) Attorney, Agent, or Firm—Armstrong, Westerman & Hattori, LLP

(57) ABSTRACT

A vehicle glass includes an outer surface and an inner surface opposing the outer surface. A circumferential edge joins the inner and outer surfaces. The edge has at least, in part, a generally planar portion connected to the outer surface by an outer corner and connected to the inner surface by an inner corner. The planar portion is disposed at an acute angle with respect to the outer surface. Furthermore, the outer corner also has a radius less than one half the thickness of the vehicle glass.

14 Claims, 4 Drawing Sheets

VEHICLE GLASS WITH ANGLED EDGE

BACKGROUND OF THE INVENTION

1. Field of the Invention

This invention is directed to glass for use in a vehicle, such as an automobile, a sport utility vehicle, a van or mini-van, or one of a multitude of other types of vehicles. The vehicle glass of the instant invention is intended to be fixed to the vehicle or a window frame in a vehicle, as opposed to a door glass which rolls up and down. The invention is more particularly directed to a vehicle glass having an edge angled back toward an inner surface of the glass.

2. Description of the Related Art

In prior art vehicles, glass used in windows for rear quarter windows or rear windshield (backlight) applications were considered to be fixed windows, for example, in a station wagon or sport utility vehicle, the rear quarter window is fixed and does not open. In station wagons and sport utility vehicles, the rear windshield is part of the rear hatch. In this case, the rear windshield is either fixed to the hatch itself, and is not openable separate from the hatch, or is fixed to a frame inside the hatch to enable it to open separately from the hatch. In any of the above cases, the window is at least fixed to a frame. This is to be distinguished from windows in a door of a vehicle which roll up and down along a track. In the above type of fixed window, the edge of the window glass is typical ground to a rounded edge, having a radius equal to one half of the thickness of the window glass. Thus, in such a type of fixed window glass, which does not have a molding surrounding the edge, a large grinding area is visible along the edge, and additionally a large glass-to-body gap is presented.

SUMMARY OF THE INVENTION

In view of the above-described disadvantages of the vehicle glass used in a fixed window of a vehicle, the instant invention provides a vehicle glass with an angled edge which overcomes such deficiencies. More specifically, the vehicle glass in accordance with the instant invention has an edge which is angled from the front or outer surface to the back or inner surface. In other words, the edge is angled rearwardly and inwardly (toward the center of the glass) in order to provide an outer surface which has less visible grinding area along the edge (since the grinding radius is smaller than in the prior art) and also reduces the glass-to-body gap to improve the edge finish and the appearance of the vehicle glass.

Thus, a vehicle glass with an angled edge, in accordance with the instant invention, is able to have a smaller glass-to-body gap, because of the smaller radius on the outer corner near the outer surface of the glass. Thus, a vehicle glass fabricated in accordance with the instant invention provides for a significantly improved appearance of the edge of the glass itself, and of the glass/body combination, when compared with the prior art edge.

A vehicle glass in accordance with the instant invention has an outer surface and an inner surface opposing the outer surface and generally parallel therewith. A circumferential edge joins the inner or outer surfaces wherein the edge has at least, in part, a generally planar portion connected to outer surface by an outer corner and connected to the inner surface by an inner corner. Furthermore, the planar portion is disposed in an acute angle with respect to the outer surface.

Furthermore, another vehicle glass in accordance with the instant invention includes an outer surface and an inner surface opposing the outer surface and generally parallel therewith. A circumferential edge joins the inner and outer surfaces, wherein the edge has at least, in part, a generally planar portion connected to the outer surface by an outer corner and connected to an inner surface by an inner corner. Furthermore, the outer corner has a radius less than one half of the thickness of the glass and the planar portion extends rearwardly, toward the inner surface, and inwardly, toward a center of the glass.

Additionally, still another vehicle glass in accordance with the instant invention has an outer surface, and an inner surface opposing the outer surface and generally parallel therewith. A circumferential edge joins the inner or outer surfaces, wherein the edge includes an outer corner connecting the edge to the outer surface and an inner corner connecting the edge to the inner surface. The outer corner has a radius less than half of the thickness of the glass, and the edge extends rearwardly, toward the inner surface, and inwardly, toward a center of the glass.

It is an object to this invention to provide a vehicle glass to be used in a fixed application, such as a rear quarter glass or rear windshield glass, in which the visible grinding area on the edge of the glass is reduced, and also in which the glass-to-body gap is reduced, with regard to the prior art.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
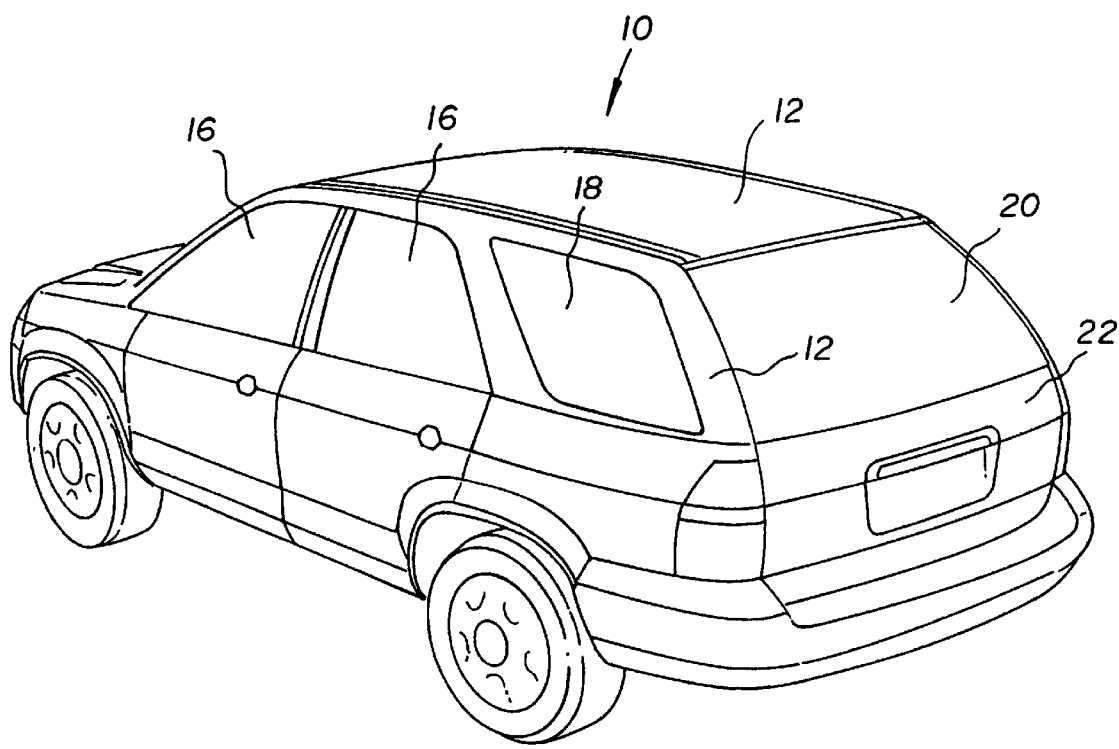
FIG. 1 is a perspective view of a vehicle employing a vehicle glass in accordance with the invention.

FIG. 1 illustrates a vehicle employing the vehicle glass in accordance with the instant invention in the rear quarter window and/or rear windshield (or backlight). Specifically, vehicle 10 illustrates a vehicle with certain fixed glass panels. The vehicle may be a sport utility vehicle, as illustrated in FIG. 1, a station wagon, a van, a mini-van, or any other type of vehicle which uses fixed glass panels. In FIG. 1, vehicle 10 has a vehicle body 12 having side windows 16, a rear quarter window 18 and a rear windshield 20. As mentioned above, rear quarter window 18 and rear windshield 20 are fixed windows, with respect to the side windows 16 which roll up and down. A front windshield may also be considered to be a fixed window. Furthermore, as noted above, even though tailgate 22 opens, rear windshield 20 is fixed to the tailgate. In certain instances, rear windshield 20 may be independently openable with respect to the tailgate, and is thus fixed to the frame which is openable with respect to the tailgate. It is contemplated that many other types of windows in a vehicle or a motor vehicle may be considered to be fixed windows, as described above, and as distinguished from side windows 16 which roll up and down.

Figure 2:
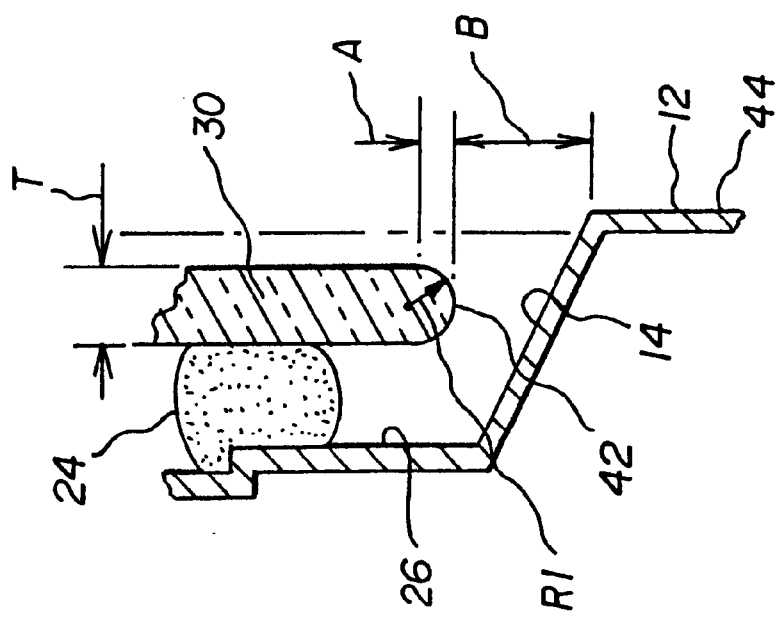
FIG. 2 is a cross sectional view of an edge of a prior art vehicle glass.

FIG. 2 illustrates the prior art vehicle glass 30. Specifically, as illustrated in FIG. 2, the vehicle body 12 has a window recess 14, in which inner surface 26 is recessed inwardly from the outer surface 44 of vehicle body 12. The prior art vehicle glass 30 is secured to window recess 14 by adhesive bead 24 which adheres prior art vehicle glass 30 to inner surface 26 of window recess 14. Prior art vehicle glass 30 has a rounded edge 42 having a radius R1, which is substantially one-half of the thickness T of the prior art vehicle glass 30.

FIG. 2 illustrates the large visible grinding area on the edge of the prior art vehicle glass 30. Specifically, distance A presents the visible grinding area on the edge. Furthermore, the distance B in FIG. 2 illustrates the glass-to-body gap of the prior art vehicle glass 30 together with window recess 14 of vehicle body 12.

Figure 3:
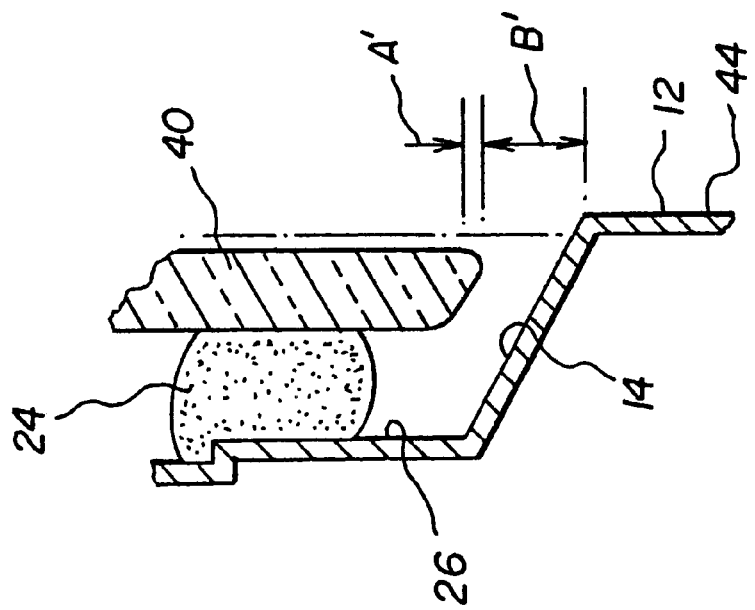
FIG. 3 is a cross sectional view of an edge of the vehicle glass in accordance with the invention, as mounted in the vehicle body.
Figure 5:
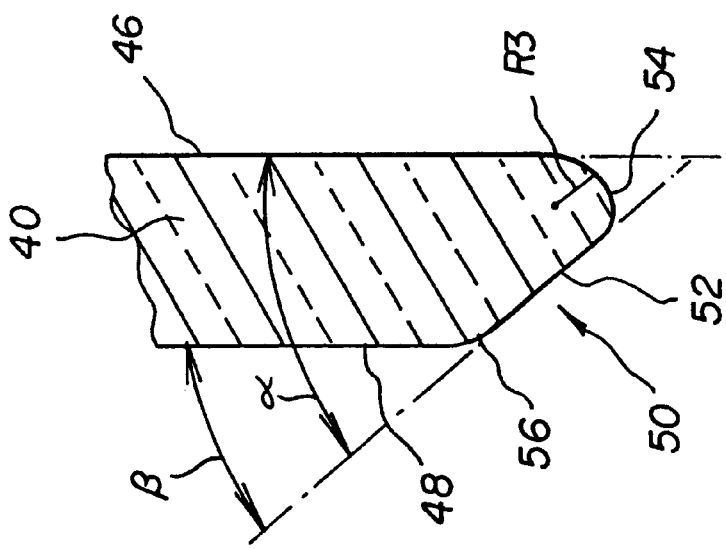
FIG. 5 is an enlarged cross sectional view of an edge of the vehicle glass having an edge angle different than in FIG. 4.
Figure 4:
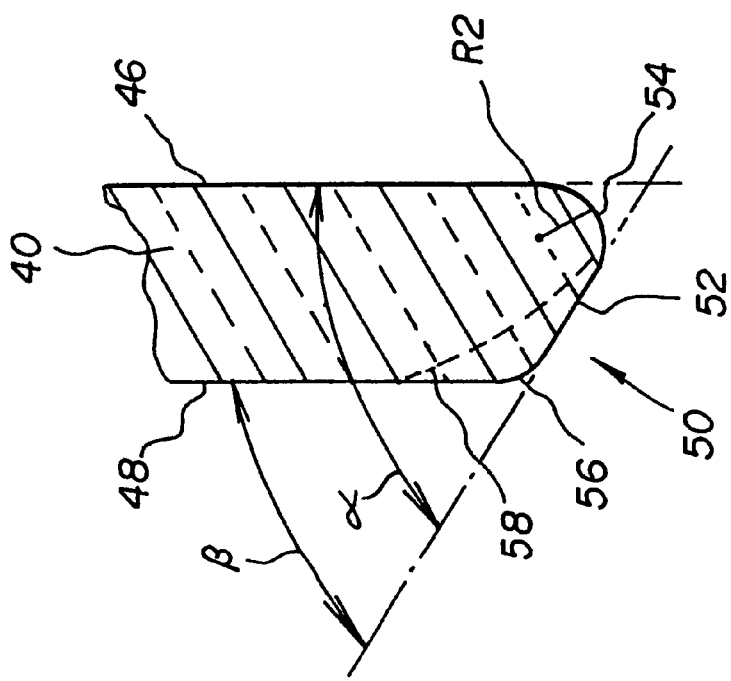
FIG. 4 is an enlarged cross sectional view of an edge of the vehicle glass.

FIG. 3 illustrates a cross sectional view of a portion of the vehicle glass, in accordance with the invention, as mounted in a vehicle body. In FIG. 3, elements of the vehicle body retain similar reference numerals as in FIG. 2. As in FIG. 2, in FIG. 3, vehicle body 12 has a window recess 14 with an inner surface 26. Vehicle glass 40 is fixed to vehicle body 12 by way of adhesive bead 24. As best illustrated in FIGS. 4 and 5, vehicle glass 40 has a glass outer surface 46 and a glass inner surface 48. Outer surface 46 and inner surface 48 are substantially parallel to one another. Vehicle glass 40 has a circumferential edge generally indicated by reference numeral 50. Edge 50 includes a generally planar portion 52, and inner corner 56 connecting planar portion 52 with inner surface 48 and an outer corner 54 connecting planar portion 52 with outer surface 46. While circumferential edge 50 would generally have planar portion 52 around the entire circumference of vehicle glass 40, it is possible that planar portion 52 may extend only partly along the edge 50 of vehicle glass 40. It is also possible that edge 50 may have a non-planar portion 58 illustrated by the dotted lines in FIG. 4. Whether edge 50 has planar portion 52 or non-planar portion 58, edge 50, in both cases, extends rearwardly, that is, toward inner surface 48 and inwardly, that is, toward a center of the glass which would be toward the top of the drawing illustrated in FIG. 4.

As noted, FIGS. 4 and 5 are enlarged views of vehicle glass 40 with edge 50. In FIGS. 4 and 5, edge angle α represents the angle between the planar portion 52 of edge 50 and outer surface 46. Similarly, in both FIGS. 4 and 5, angle β represents the angle between planar portion 52 and inner surface 48. Since inner surface 48 and outer surface 46 are substantially parallel to one another, edge angle α and angle β will always be the same. Thus, in referring to the angle of the planar portion 52, the edge angle α will be referred to.

In FIG. 4, the radius R2 is the radius of the outer corner 54. Radius F2 is less than one half of the thickness of vehicle glass 40. If radius R2 were equal to one half the thickness of vehicle glass 40, then outer corner 54 would essentially extend from outer surface 46 to inner surface 48. In FIG. 5, please note that the radius of outer corner 54 is indicated as R3. In the example shown in FIG. 4, the angle α is approximately 60°. Radius R2 is less than one half the thickness of vehicle glass 40, which is also less than radius R1 (see FIG. 2) of the prior art vehicle glass 30. The example in FIG. 5 illustrates the situation where the angle α is approximately 45°. In both FIGS. 4 and 5, edge angle α is an acute angle, that is, an angle less than 90°. Referring back to FIG. 5, since edge angle α is 45°, which is less than the 60° edge angle of FIG. 4, radius R3 is correspondingly smaller than radius R2 of FIG. 4. Thus, in comparing the edge 50 of vehicle glass 40 of FIGS. 4 and 5 to the prior art of FIG. 2, it can be seen that the following relationship is clearly established:

$$R1 > R2 > R3.$$

Referring back to FIG. 3, the specific shape of edge 50 of vehicle glass 40 illustrated in FIGS. 4 and 5 can be used in the vehicle glass 40 of FIG. 3. As noted in FIG. 3, the visible grinding area is indicated by the distance A'. Correspondingly, in FIG. 3, the glass-to-body gap is illustrated as distance B'. It can be clearly seen that in FIG. 3, the distance A' is less than the distance A in FIG. 2. Clearly, the visible grinding area of the edge 50 in accordance with the instant invention is less than that of the prior art. Similarly, the glass-to-body gap B' of FIG. 3 is less than the glass-to-body gap B in the prior art of FIG. 2.

In considering the examples of FIGS. 4 and 5 where the edge angle α is 60° and 45°, respectively, the radius R2 (when α equals 60°) is approximately 52% of the length of the radius R1 of the prior art of FIG. 3. In the example of FIG. 5, where the edge angle α equals 45°, the radius R3 of outer corner 54 is approximately 45% of the length of radius R1 of the prior art of FIG. 2. It can be seen that the visible grinding area, represented by the distance A', is substantially less than that of the distance A of FIG. 2. While any range less than 90° for the edge angle α could be used, it is considered that a range between 90° and 20° is preferable. More preferably, a range between 40° and 65° could be used. Angles of 45°, 60° or any angle therebetween would be even more highly preferable.

Figure 6:
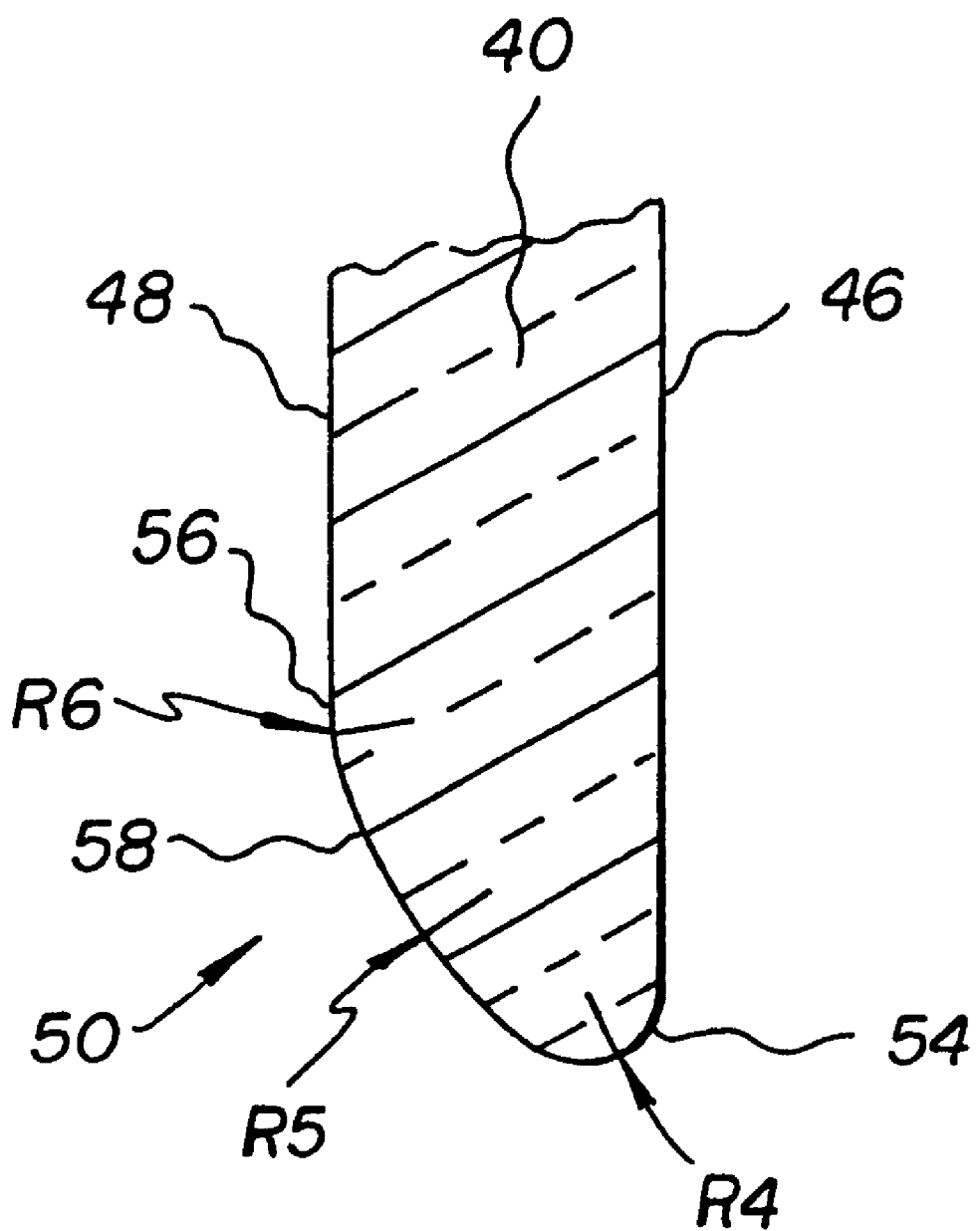
FIG. 6 is an enlarged cross sectional view of an edge of the vehicle glass having a different profile than in FIGS. 4 and 5.

FIG. 6 illustrates an enlarged cross sectional view of an edge of the vehicle glass having a different profile than that of FIGS. 4 and 5. Specifically, in FIG. 6, outer surface 46 and inner surface 48 are the same as in FIGS. 4 and 5. Edge 50, has a non-planar portion 58 similar to that illustrated in FIG. 4. More specifically, non-planar portion 58 is joined to outer surface 46 by way of outer corner 54 and to inner surface 48 by way of inner corner 56. As seen in FIG. 6, the radius of outer corner 54 is indicated by reference R4. The radius of inner corner 56 is indicated by reference R6. The radius of non-planar portion 58 is indicated by reference R5. In the profile of FIG. 6, there is no planar portion 52 as in FIGS. 4 and 5. However, radius R5 of the non-planar portion 58 is generally large. Radius R4 of outer corner 54 is generally small with regard to radius R5. Furthermore, radius R6 of inner corner 56 is generally smaller than radius R5 and larger than radius R4. In fact, it is possible that inner corner 56 and non-planar portion 58 may form a single smooth arc in which radius R5 is equal to radius R6. As described above, edge 50 in FIG. 6 extends rearwardly, toward inner surface 48, and inwardly, toward a center of vehicle glass 40 (that is, toward the top of the sheet of FIG. 6).

The edge, as seen in FIG. 6, is convex, meaning that it has no concave portions.

Thus, by employing the instant invention, an improved appearance may be obtained for fixed window glass, such as a rear quarter window or a rear windshield by employing an angle type of cut or grinding on the glass edge in order to reduce the glass-to-body gap and further in order to reduce the visible grinding area on the edge of the glass.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle glass, comprising;

an outer surface;

an inner surface opposing said outer surface; and a circumferential edge joining said inner and outer surfaces, wherein said edge comprises an outer corner connecting said edge to said outer surface, and an inner corner connecting said edge to said inner surface, wherein said outer corner comprises a radius less than one half the thickness of the glass, and an edge portion intermediate the inner corner and the outer corner extends rearwardly, toward the inner surface, and inwardly, toward a center of the glass at; an acute angle wherein said acute angle is less than 65 degrees and greater than 40 degrees and wherein said edge extends around an entire circumference of the glass.

2. The vehicle glass of claim 1, wherein said edge portion intermediate the inner corner and the outer corner comprises at least, in part, a generally planar portion connected to said outer surface by the outer corner and connected to said inner surface by the inner corner.

3. The vehicle glass of claim 2, wherein said acute angle is substantially 60°.

4. The vehicle glass of claim 2, wherein said acute angle is substantially 45°.

5. The vehicle glass of claim 2, wherein the outer corner radius is less than approximately one-quarter of a thickness of the vehicle glass.

6. The vehicle glass of claim 1, wherein said edge portion intermediate the inner corner and the outer corner comprises at least, in part, a generally planar portion connected to said outer surface by the outer corner and connected to said inner surface by the inner corner, and further wherein, said planar portion extends rearwardly, toward the inner surface, and inwardly, toward the center of the glass.

7. The vehicle glass of claim 1, wherein said edge portion intermediate the inner corner and the outer corner is non-planar.

8. In combination: a vehicle body and a vehicle glass;

the vehicle glass being fixed in a frame portion of the vehicle body;

the vehicle glass comprising an outer surface, an inner surface, and a circumferential edge disposed adjacent to the frame portion of the vehicle body; and the circumferential edge comprising an outer corner comprising a first radius less than approximately one-half of a thickness of the vehicle glass and a convex portion between the first radius and the inner surface;

whereby a visible grinding area is reduced at the outer corner.

9. The vehicle glass of claim 8, wherein the first radius is less than approximately one-quarter of a thickness of the vehicle glass.

10. The vehicle glass of claim 8, wherein the convex portion comprises a second radius greater than the first radius.

11. The vehicle glass of claim 10, comprising an inner corner disposed between the inner surface and the convex portion, the inner corner comprising a third radius greater than the first radius and less than the second radius.

12. The vehicle glass of claim 6, wherein the convex portion comprises a planar portion.

13. The vehicle glass of claim 12, comprising an inner corner, the inner corner comprising a third radius less than approximately one-half of a thickness of the vehicle glass and being disposed between the inner surface and the planar portion.

14. The vehicle glass of claim 8, wherein the vehicle body is substantially parallel to the vehicle glass adjacent to the circumferential edge.

* * * * *